United States Patent [19]

Palvölgyi

[11] Patent Number: 5,791,387

[45] Date of Patent: Aug. 11, 1998

[54] CLOSABLE FUEL FILL INLET STUB, PARTICULARLY TO FILL LEAD-FREE GASOLINE INTO THE FUEL TANK OF A MOTOR VEHICLE

[75] Inventor: Sandor Palvölgyi, Gleisdorf, Austria

[73] Assignee: Blau International GesmbH, Preding, Austria

[21] Appl. No.: 705,113

[22] Filed: Aug. 29, 1996

[30] Foreign Application Priority Data

Sep. 19, 1995 [AT] Austria ................................ A 1556/95

[51] Int. Cl.⁶ ...................................................... B65B 1/04
[52] U.S. Cl. ........................... 141/348; 141/350; 141/301; 220/86.2
[58] Field of Search ........................... 141/312, 348–350, 141/291, 292, 294, 301, 302; 220/86.2, 86.3, DIG. 33, 746, 749, 262–264; 251/158, 175, 187, 89.5, 149.2; 137/527

[56] References Cited

U.S. PATENT DOCUMENTS

| 2,247,509 | 7/1941 | Lebus | 220/86.2 |
| 2,855,961 | 10/1958 | Wells | 141/348 |
| 3,133,741 | 5/1964 | Garabello | 220/86.2 |
| 4,739,808 | 4/1988 | Schmidt | 141/302 |
| 5,485,871 | 1/1996 | Romanek et al. | 220/86.2 |

FOREIGN PATENT DOCUMENTS

| 0 296 618 | 12/1988 | European Pat. Off. |
| 1 200 150 | 9/1965 | Germany |

Primary Examiner—Henry J. Recla
Assistant Examiner—Steven O. Douglas

[57] ABSTRACT

To securely retain a valve flap (10) against an opening (8) in a fill end stub for liquid fuel, typically unleaded gasoline, a pivotable engagement finger (15, 35) is engageable with the flap and held against the opening by an operating system (18, 28, 38) operable by the vehicle operator, for selective engagement of the finger (15, 35) against the underside of the flap (10) to selectively press the flap against the opening and close the opening, or to permit pivoting of the flap away from the opening if an appropriate gasoline fill-in nozzle is pressed against the flap.

14 Claims, 2 Drawing Sheets

CLOSABLE FUEL FILL INLET STUB, PARTICULARLY TO FILL LEAD-FREE GASOLINE INTO THE FUEL TANK OF A MOTOR VEHICLE

REFERENCE TO RELATED PRIOR ART

German Laid-Open Published Application 1 200 150, Garabello; European 0 296 618 A2, Jansky et al.

FIELD OF THE INVENTION

The present invention relates to a fuel fill inlet stub for liquid fuel, and more particularly to an inlet stub for use in motor vehicles which accept fuel dispensing nozzles designed to dispense fuel of a particular kind, and especially lead-free gasoline, and nothing else. The fuel inlet stub is closed by the flap of a flap valve under control of the vehicle operator, so that further external closure caps, customarily known as gasoline caps, are not needed.

BACKGROUND

Fuel inlet stubs, or end portions of fuel inlet pipes frequently have a flap closing off an opening dimensioned to receive a fuel dispensing nozzle designed to pass through the opening, for dispensing of lead-free gasoline, but not fuel of other types. Flaps, which are also known as lead-free flap valves, usually, can be opened only by introducing the end portion of the fuel dispensing nozzle, designed for lead-free gasoline. Fuel dispensing nozzles for other fuels, for example, leaded fuels and the like, by national standard, have a larger outer diameter which does not permit passing the dispensing nozzle through the opening, and hence opening of the flap. The flap, thus, is used to prevent filling of the tank with leaded gasoline, or other fuels.

To tightly close the end portion of the fill pipe, or a fill stub, a special closure is necessary, for example a cover, such as a gasoline cap, with a screw thread, or a bayonet closing arrangement. This cap has to be removed manually before fuel can be introduced. Entirely apart from the necessary handling, which sometimes leaves a smelly residue on the hands of the user, a separable gas cap may get lost. It has been proposed, therefore, to eliminate a separate gasoline cap or the like, and to rely only on the lead-free flap valve at the end of the inlet stub. This, however, has not been found to be practical in actual use, since the lead-free flap is not tightly enough engaged with the stub to reliably prevent escape of fuel or vapors. The spring which retains the flap against the opening of the inlet stub must be rather weak, in order to ensure easy introduction of the dispensing nozzle.

THE INVENTION

It is an object to provide a closure arrangement for a fuel inlet stub to introduce fuel into the fuel tank of a motor vehicle, and which is so arranged that it does not require timeconsuming manipulation of a separate gas cap or the like, but, nevertheless, provides a tight closure of the fill stub, and ensures that no fuel, or gases can escape in operation of the vehicle, regardless of vibrations, shocks and the like, to which the vehicle may be subjected.

Briefly, a pivotable engagement finger is provided in addition to the customary holding spring for the flap, for example positioned adjacent to the flap. An operating device, externally controllable, for example by the operator of the vehicle, provides, by a mechanical, electrical, or pressure connection for selective positive engagement of the finger against the underside of the flap to urge the flap towards the inner edge of the fill opening of the fill stub.

In accordance with the invention, therefore, the lead-free gasoline flap can be used also as the actual closure element so that a separate gas cap is no longer necessary. The engagement finger is selectively operable to ensure, on the one hand, tight positive seating of the flap when the vehicle is in operation and, on the other, easy introduction of a dispensing nozzle which can readily overcome the pressure of the comparatively weak spring holding the flap in position.

The construction in accordance with the present invention, of course, is not limited to a stub designed only for lead-free gasoline; this, however, is only the initial motivation for the invention. By suitable dimensioning of the opening in the fill stub, and of the flap, the arrangement can also be used to permit the introduction of fill nozzles filling different types of fluids, for example leaded gasoline, kerosene or the like, from a dispensing nozzle into containers other than automotive tanks designed to accept only unleaded gasoline.

In accordance with a preferred feature of the invention which is particularly easy to construct, and hence inexpensive, the pivot axes of the engagement finger and of the flap are designed to be congruent.

In accordance with another preferred embodiment of the invention, the engagement finger is a two-armed lever, in which one lever arm engages the underside of the flap, and the operating device engages the other lever arm. As an alternative arrangement, a one-armed lever can be formed in which a long lever portion engages the underside of the flap, and the operating device engages the short lever portion of the one-armed lever. In both cases, it is easy to select the force and distance relationship between the operating device and movement of the engagement finger to provide for positive seating of the flap against a ring seal in the stub, by suitable selection of the length of the respective lever arms, or lever arm portions.

The present invention permits a simple way to seal the flap against the stub; in any case, and in accordance with a preferred feature of the invention, the lower side of the stub is formed with a circular seal surrounding the opening, which seal is radially outwardly offset from the edge of the opening. This protects the ring-seal from undesired contact with the dispensing nozzle, so that danger of damage of the seal is effectively avoided, and the sealing effect thereof is ensured over a long period of time.

A further and particularly preferred embodiment of the invention has an effectively similar object, by constructing the sealing surface of the flap, which is to cooperate with the ring seal to be backwardly offset with respect to the adjacent radially inner region of the flap. This protects the sealing surface of the flap when the dispensing nozzle is introduced into the stub, since the dispensing nozzle presses the flap laterally. The adjacent region of the flap at the inside is thus protected from contact with the dispensing nozzle, and a sealing surface, over a long period of time and many operating cycles, retains its integrity and thus additionally ensures that the sealing effect is retained.

The engagement finger itself can be constructed in any suitable manner, for example as a shaped part, as an injected or cast part made of metal or other materials. Preferably, the finger is made of a strip of spring steel, which provides for automatic compensation for assembly tolerances and the like, without affecting the tight seal of the flap against the stub.

The operating device for the engagement finger can be of many types well-known in vehicular technology. In accordance with one preferred embodiment, the operating device is a small servo motor which is coupled to a cam which, in turn, engages against the engagement finger, or the lever arm; as an alternative, a pneumatic piston-cylinder arrangement can be provided, which directly, or via a link, is coupled to the engagement finger or the lever. Both of these embodiments provide, in simple dashboard manner, for remote control of the closure, for example by operating a switch on the dashboard or on a command, or a control panel of the vehicle, in which the switch controls the servo motor, or the pneumatic piston-cylinder arrangement. In accordance with another alternative, the operating device is a cam engaging the engagement finger; the cam, itself, can be rotated by a Bowden cable. Preferably, the cam is locked in position by a safety hook which is pivoted to rotate over a rotation axis perpendicular to the rotation axis of the cam, and which includes a guide region for passage of the is Bowden cable. When the Bowden cable is tensioned to release the engagement finger, the safety hook is disengaged from the cam. This arrangement easily permits control of the closure arrangement mechanically, merely by a cable which, for example, can terminate close to the driver's seat of the vehicle.

In accordance with a preferred feature of the invention, the cam, the safety hook, and any other components in the operating arrangement, are balanced over their respective axes of rotation, so that even excessive accelerations and decelerations; for example in connection with an accident or a crash, cannot cause force moments, or torques about the rotary axis to arise, which might result in unintended opening of the gasoline valve. This arrangement thus provides security in case of an accident or a crash and substantially increases the safety by ensuring secure retention of flammable fluids.

In any embodiment, and in accordance with a preferred feature of the invention, an On-board Refueling Vapor Recovery valve, also known as an ORVR valve, is located below the flap, and the operating device, when in the position of engagement with the engagement finger, also operates the ORVR valve. Simultaneous operation of the engagement finger, as well as of the ORVR valve, by a single operating device is thus possible.

DRAWINGS

The drawings illustrate various embodiments, wherein

DETAILED DESCRIPTION

Figure 1:
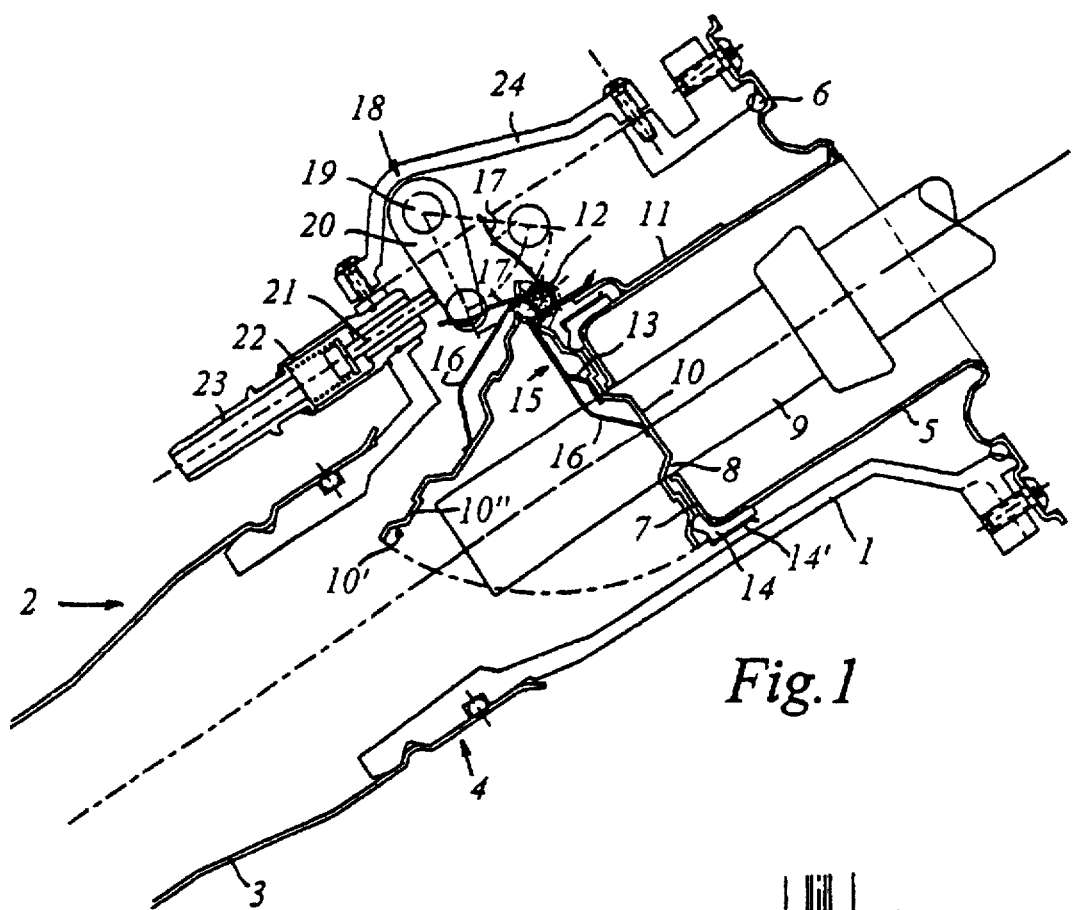
FIG. 1 is a longitudinal section of a first embodiment of the fill stub and closure device in accordance with the invention.
Figure 3:
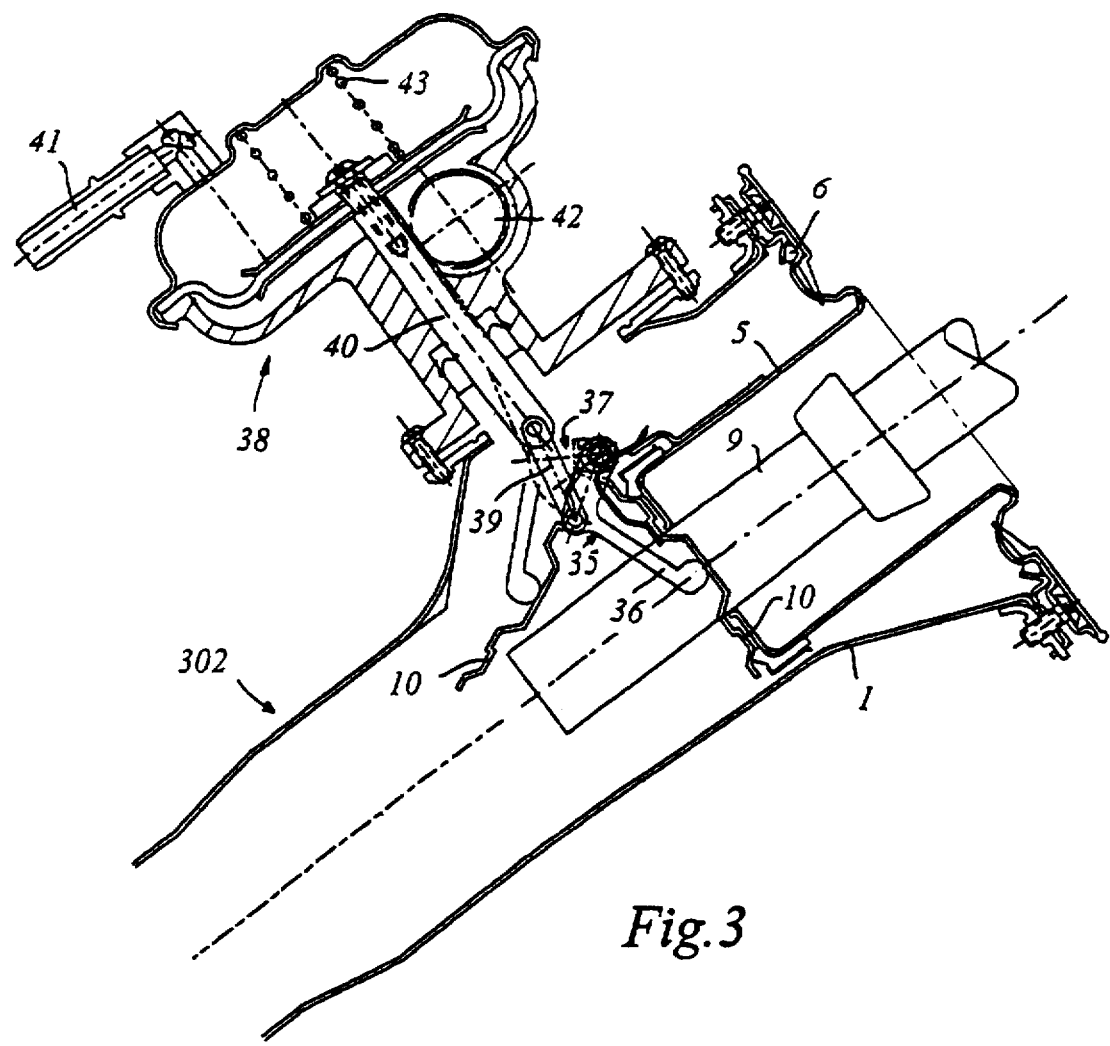
FIG. 3 is a longitudinal cross-section of a second embodiment of the fuel inlet stub and flap and closure arrangement in accordance with the present invention.

Referring first to FIG. 1, which shows the upper end 1 of a fill stub 2, the other end of which, not shown, leading to a vehicle fuel tank. The upper end 1 of the fill stub 2, in the example shown, is formed by separate casting which is sealingly connected at the sealed connection 4 to the upper end portion 3 of the fill in stub 2. Alternatively, the entire fill stub 2 can be combined with its upper end 1 as a single structure, an example of which is shown in FIG. 3.

A pot- or cup-shaped insert 5 is sealingly connected, by means of seal 6, into the upper end 1 of the fill end stub 2.

The pot-shaped insert 5 has an opening 8 at its lower end 7 to permit a fuel dispensing nozzle 9, shown only schematically, to pass through the opening 8. The opening 8 is closed by a flap 10 of a flap valve. FIG. 1 shows the flap in closed position, as well as in open position. The flap 10 is pivoted at a suitable bearing 11, secured to the outer side of the insert 5, to pivot about a pivot axis 12. A spring 13 engages the lower, or underside, of the flap 10 to bias an upper side the flap 10 against the lower edge of the opening 8. The spring 13 is so designed that the flap 10 can be laterally pivoted upon introduction of the dispensing nozzle 9 into the opening 8.

A ring seal 14 is located between the underside of the insert 5 and the upperside of the flap 10. In accordance with a feature of the invention, the ring-seal 14 engages the outer circumference of the insert 5; it is sealingly retained on the insert 5 by means of a tension ring 14' or a similar arrangement. The ring-seal 14 is radially outwardly offset from the edge of the opening 8, so that unintended, or casual contact of the nozzle 9 with the ring-seal 14 cannot occur.

The sealing surface 10' of the flap is offset downwardly, with respect to the introduction direction of the nozzle 9 for the same reason; thus, the sealing surface 10' of the flap 10 is axially offset downwardly with respect to the radially inward neighboring region 10" of the flap 10, so that the fill nozzle 9, upon pivoting the flap 10 laterally, will slide on the region 10" and, upon further introduction, pass over, or jump over, the sealing region 10'—as clearly seen in FIG. 1. This ensures integrity of sealing engagement of the sealing surface 10' of the flap 10 with the ring-seal 14.

In accordance with a feature of the invention, and in order to ensure a perfect seal when the flap 10 is in closed position, an engagement finger 15 is provided, besides the spring 13, engaging the flap 10. The axis of operation of the finger 15, in the example illustrated, coincides with, or is congruent with the pivot axis 12 of the flap 10; the finger 15 can be located laterally adjacent the pivot of the flap 10. It is not a necessary feature, however, that the axis 12 of the flap 10 and the operating axis of the finger 15 coincide. The engagement finger 15 is formed of a substantially L-shaped, angled-off strip of spring steel and forms a double-armed lever. One of the lever arms 16 engages the lower side or bottom side of the flap 10; the other lever arm 17 is engaged by an operating device 18.

The operating device, in the embodiment shown in FIG. 1, is formed by a servo motor of which, for simplicity of the drawing, only the output shaft 19 can be seen in FIG. 1. The shaft 19 engages a cam or cam lever 20 which, in turn, acts on, for example, engages the lever arm 17 of the spring finger 15, such that the lever 16, when the flap 10 is to be closed, can be biased against flaps 10, to forcefully engage the seal 14 on the lower side of the insert 5 independently of the force of spring 13.

As seen in FIG. 1, cam 20, when in its full line position, also operates a vent valve 22 by a control pin 21. The valve 22 vents the space between the insert 5 and the upper end 1 of the fill stub 2 into open position. The valve 22 is an overflow valve and, when open, returns a possible fuel excess via connection 23 back into the tank. Alternatively, the valve can be constructed as an ORVR valve (On-board Refueling Vapor Recovery valve) over which fuel, and especially gasoline vapor or any excess overflow can be guided into a suitable receptacle tank (not shown).

The engagement finger 15 and the operating device 18 are sealingly retained in an enlargement 24 of the upper end of the fill stub 2, to be sealed with respect to ambient surroundings. It is also possible to only locate the cam or lever 20 of the operating device within the interior of the fill-in stub enlargement 24, in which case, however, the shaft 19 must pass through the enlargement 24 through a suitable axial seal. This permits locating the servo motor operating the shaft 19 outside of the enlargement 24.

Figure 2:
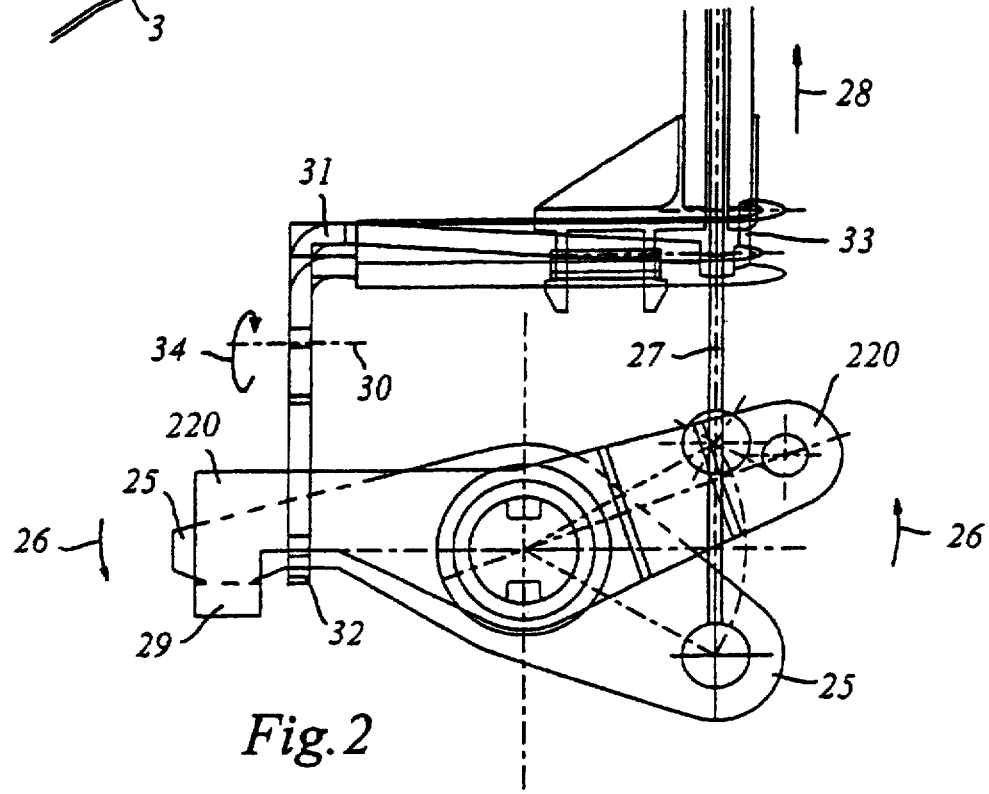
FIG. 2 is a schematic top view of a cable operating device for the closure arrangement of FIG. 1.

FIG. 2 illustrates an alternative embodiment in which the cam 220, similar to cam 20 in FIG. 1, is mechanically operated. The cooperation of cam 220 with the engagement finger 15 is identical to that illustrated in FIG. 1 and will not be described or shown again. Cam or lever 220, in its quiescent position, engages the engagement finger 15. A co-axially located operating driver or dog element 25 has the tendency to pivot the cam 220 in the direction of the arrow 26 into unloaded position when the cable 27 of a Bowden cable is operated in the direction of the arrow 28. The element 25 engages against a projection 29 located at the other lever end of the cam or lever 220. An, e.g. spring loaded, safety hook 31, pivotable about pivot axis 30, reaches over the cam or lever 220 with projection 32, when in quiescent, that is, non-operated position, in which the valve is closed. The projection 32 prevents pivoting of the cam or lever 220. The cable 27 is coupled through a guide 33 of the hook 31 in such a manner that tensioning of the inner wire of cable 27 unlatches the hook 31, by rotation in the direction of the arrow 34, from engagement with the cam or lever 220. In operation, thus, upon tensioning the cable 27, first, the safety hook 31 is unlatched, and further tension on the cable 27 pivots the element 25, and hence the cam or lever 20 to unload, or release pressure on the engagement finger 15.

In accordance with a feature of the invention, all movable elements, cam or lever 20, or 220, respectively, the element 25, and the safety hook 31 are balanced in relation to their respective axis of rotation, so that, upon high acceleration or deceleration, for example in case of a crash, no torques can arise which might cause unlatching of the hook 31, 32. Arranging the axis of rotation of the cam or lever 220, of element 25 on the one hand and of the safety hook 31 on the other, at right angles with respect to each other, further contributes to reliability of keeping the valve closed in case of extreme deceleration, for example due to a crash or other accident.

The engagement finger 15 need not be in the form of a double-armed lever; FIG. 3 illustrates an embodiment in which the engagement finger 35 for flap 10 is a single-armed lever, having a long lever portion 36 engaging the bottom side of the flap 10, and a short lever portion 37, coupled to an operating device 38. The engagement finger 35, in the embodiment shown in FIG. 3, is a cast element.

The operating device 38 is a pneumatic piston 40 coupled to finger 35 by a link 39. The pneumatic piston 40 can be operated via a vacuum line 41 and, when not pressurized, is biased by a spring 43 into the closing position of the flap 10. Rather than using a pneumatic operator, electrical operation, for example over a worm gear, a linear motor, a rack and pinion arrangement or the like could be used. The pneumatic motor could also engage a pinion 42, or the pinion 42 can be driven by a motor or the like. Generally, any type of operating system can be used, the only requirement being that the engagement finger 15, 35 is suitably biased, or forced against the flap 10.

The operating device may also be located outside of the enlargement 24; the actual operating element, be it a shaft, a push rod or the like, then passes through the enlargement 24 in a sealed arrangement, and engages the link 39, or the finger 15, or lever arm 36 of finger 35, respectively.

FIG. 3 also shows another feature: the insert 5 is directly secured into an outer enlargement of the inlet stub 302, rather than through the intermediate element 1.

Various changes and modifications may be made and any features described herein in connection with any one of the embodiments may be used with any of the others, within the scope of the inventive concept.

I claim:

1. Fuel fill inlet stub for liquid fuel, optionally for lead-free gasoline, to be filled into a fill pipe of a vehicle tank, said stub having an inner end formed with an opening (8) to permit passage of a fuel dispensing nozzle (9);

a pivotable flap (10), and spring means (13) spring biassing an upper side of said flap towards the opening (8), and comprising, in accordance with the invention, a pivotable engagement finger (15, 35), selectively, positively engageable with an underside of said flap; and an externally controllable operating means (18, 27, 38) operatively engageable with the engagement finger (15, 35) for selective, positive engagement of the finger (15, 35) against the underside of the flap (10) to selectively positively press the flap (10) against said opening (8), and thereby, selectively, close and seal said opening or permit pivoting of said flap away from the opening (8).

2. The inlet stub of claim 1, wherein said pivotable flap (10) is pivotable about a pivot axis (12); and wherein the pivot axis (12) of said flap, and the pivot axis of the pivotable engagement finger (15, 35) are congruent.

3. The inlet stub of claim 1, wherein said engagement finger (15) comprises a two-armed lever, having one lever arm, (16) engaging said flap (10) and a second lever arm (17) coupled to said operating means (18, 27).

4. The inlet stub of claim 1, wherein said pivotable engagement finger (35) comprises a one-armed lever, having a long lever portion (36) engageable against the underside of the flap (10), and a short lever portion (38) coupled to said operating means.

5. The inlet stub of claim 1, further including a ring seal (14) located adjacent the inner end of said stub, and surrounding said opening (8), said ring seal being radially outwardly spaced from said opening.

6. The inlet stub of claim 5, wherein said flap (10) is formed with a sealing surface (10') engageable against said opening (8), said sealing surface being axially spaced from a radially inward region (10") of said flap;

said sealing surface (10') on the flap being sealingly engageable with said ring seal (14).

7. The inlet stub of claim 1, wherein said flap (10) is formed with a sealing surface (10') engageable against said opening (8), said sealing surface being axially spaced from a radially inward region (10") of said flap.

8. The inlet stub of claim 1, wherein said engagement finger (15) comprises a strip of spring steel.

9. The inlet stub of claim 1, wherein said operating means comprises a servo motor having a shaft (19), and a cam or cam lever (20) coupled to said servo motor shaft in engagement with said pivotable engagement finger (15).

10. The inlet stub of claim 1, wherein the operating means (38) comprises a pneumatic piston (40) coupled to said finger (35), optionally, by means of a link element (39).

11. The inlet stub of claim 1, wherein said operating means (27) comprises a cam or cam element (220) engaging said finger (15);

a Bowden cable (27);

a driver or dog (25) coupled to said Bowden cable and rotatable thereby, engaging said cam element (220);

a safety hook (31) pivotable about a pivot axis (30) perpendicular to the pivot axis of said cam element (220) and selectively hooking over said cam element (220);

and a guide means (33) for said Bowden cable engageable with said safety hook for selectively disengaging the safety hook from the cam element upon tensioning of the Bowden cable.

12. The inlet stub of claim 11, wherein the cam element (220), the driver or dog (25) and said safety hook (31) are balanced with respect to the respective axes of rotation.

13. The inlet stub of claim 1, further including an auxiliary valve (22) forming, optionally, an overflow valve or a ORVR valve coupled to said operating means (18, 35, 27) for said engagement finger, to operate said auxiliary valve when the engagement finger (15) presses the flap (10) against said opening (8).

14. The inlet stub of claim 1, wherein spring means, operable about an axis (12) of rotation are provided for biasing said flap (10) against said opening (8);

and said pivotable finger (15, 35) is located laterally adjacent said spring means (13) and pivotable about a pivot axis parallel to, or concentric with the pivot axis for said spring means.

* * * * *